(12) United States Patent
Tyler et al.

(10) Patent No.: US 11,549,456 B2
(45) Date of Patent: Jan. 10, 2023

(54) SYSTEM, METHOD AND APPARATUS FOR ENGINE CONTROL

(71) Applicant: GDP Tuning, LLC, Rexburg, ID (US)

(72) Inventors: Benjamin Tyler, Boston, MA (US); Barry Pierce, Sugar City, ID (US)

(73) Assignee: GDP Tuning, LLC, Rexburg, ID (US)

( * ) Notice: Subject to any disclaimer, the term of this patent is extended or adjusted under 35 U.S.C. 154(b) by 0 days.

(21) Appl. No.: 17/447,664

(22) Filed: Sep. 14, 2021

(65) Prior Publication Data

US 2021/0404398 A1 Dec. 30, 2021

Related U.S. Application Data

(63) Continuation of application No. 16/596,462, filed on Oct. 8, 2019, now Pat. No. 11,118,524, which is a continuation of application No. 15/881,753, filed on Jan. 27, 2018, now Pat. No. 10,436,136.

(51) Int. Cl.
*F02D 41/08* (2006.01)
*G05B 15/02* (2006.01)
*F02D 41/24* (2006.01)

(52) U.S. Cl.
CPC ......... *F02D 41/08* (2013.01); *F02D 41/2487* (2013.01); *G05B 15/02* (2013.01); *F02D 2200/604* (2013.01)

(58) Field of Classification Search
CPC ................. F02D 41/08; F02D 41/2487; F02D 2200/604; G05B 15/02
See application file for complete search history.

(56) References Cited

U.S. PATENT DOCUMENTS

| 3,433,373 | A | * | 3/1969 | Carey | ...................... B61D 7/30 |
| | | | | | 414/269 |
| 3,896,779 | A | * | 7/1975 | Omori | .................. F02M 59/366 |
| | | | | | 123/483 |
| 4,930,480 | A | | 6/1990 | Noyori | |
| 4,989,147 | A | | 1/1991 | Ishii | |
| 2010/0161134 | A1 | | 6/2010 | Takahashi | |

FOREIGN PATENT DOCUMENTS

| CN | 202098410 U | * | 1/2012 | | |
| WO | WO-03029039 A1 | * | 4/2003 | ............ | B60W 10/02 |
| WO | WO-2011034084 A1 | * | 3/2011 | ............. | F02D 29/02 |
| WO | WO-2011142039 A1 | * | 11/2011 | ............. | B60G 13/02 |

* cited by examiner

*Primary Examiner* — Joseph J Dallo
(74) *Attorney, Agent, or Firm* — Schultz & Associates, P.C.

(57) ABSTRACT

System, method, and apparatus for controlling performance of an engine in response to a set of outputs from a device to an engine control unit. The engine control unit receives profile parameters that are related to outputs of the device. The engine control unit engages a high performance functionality in response to a first signal. The engine control unit engages a high idle functionality in response to a second signal.

20 Claims, 4 Drawing Sheets

(system diagram)

Figure 1 (system diagram)

Figure 2 (circuit diagram)

Figure 3 (sequence diagram)

SYSTEM, METHOD AND APPARATUS FOR ENGINE CONTROL

CROSS REFERENCE TO RELATED APPLICATIONS

This application is a continuation of U.S. application Ser. No. 16/596,462 filed Oct. 8, 2019, now U.S. Pat. No. 11,118,524 granted on Sep. 14, 2021, which is a continuation of U.S. application Ser. No. 15/881,753 filed Jan. 27, 2018, now U.S. Pat. No. 10,436,136 granted on Oct. 8, 2019. The patent application identified above is incorporated here by reference in its entirety to provide continuity of disclosure.

FIELD OF THE INVENTION

The field of the invention relates to the manipulation of engine control units. In particular, the field of the invention relates to the manipulation of engine control units for adjusting vehicle performance.

BACKGROUND OF THE INVENTION

Modern vehicles include engine control units to electronically control series of actuators with of the internal combustion engine within the vehicle. The engine control unit reads values from multiple sensors of the vehicle and interprets the data using multidimensional performance maps and look up tables stored in a profile to determine performance settings that will be used to control the actuators and the performance of the engine. The electronic control unit can control air-fuel mixtures, ignition timing, and the idle speed of the engine.

A problem with modern engine control units is that they cannot be updated while the vehicle is being operated and do not provide simple access to high idle and high performance modes during vehicle operation.

SUMMARY OF THE INVENTION

System, method, and apparatus for controlling performance of an engine in response to a set of outputs from a device by an engine control unit. The engine control unit receives profile parameters that are related to outputs of the device. The engine control unit receives a first signal from a device, engages a high idle functionality in response to a first value of the first signal, and engages a high performance functionality in response to a second value of the first signal.

BRIEF DESCRIPTION OF THE DRAWINGS

The disclosed embodiments will described with reference to the accompanying drawings. Like pieces in different drawings carry the same number.

DETAILED DESCRIPTION OF THE INVENTION

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM"), an electronically erasable programmable read-only memory ("EEPROM"), a flash memory, an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, Objective-C, C++, C#, VB.NET, Python or the like, conventional procedural programming languages, such as the "C" programming language, Visual Basic, Fortran 2003, Perl, COBOL 2002, PHP, ABAP, dynamic programming languages such as Python, PHP, HTML, AJAX, Ruby and Groovy, or other programming languages. The program code may execute entirely or partially on one or more of the devices of the system.

Aspects of the present disclosure are described with reference to flowchart illustrations and/or block diagrams of methods, systems, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
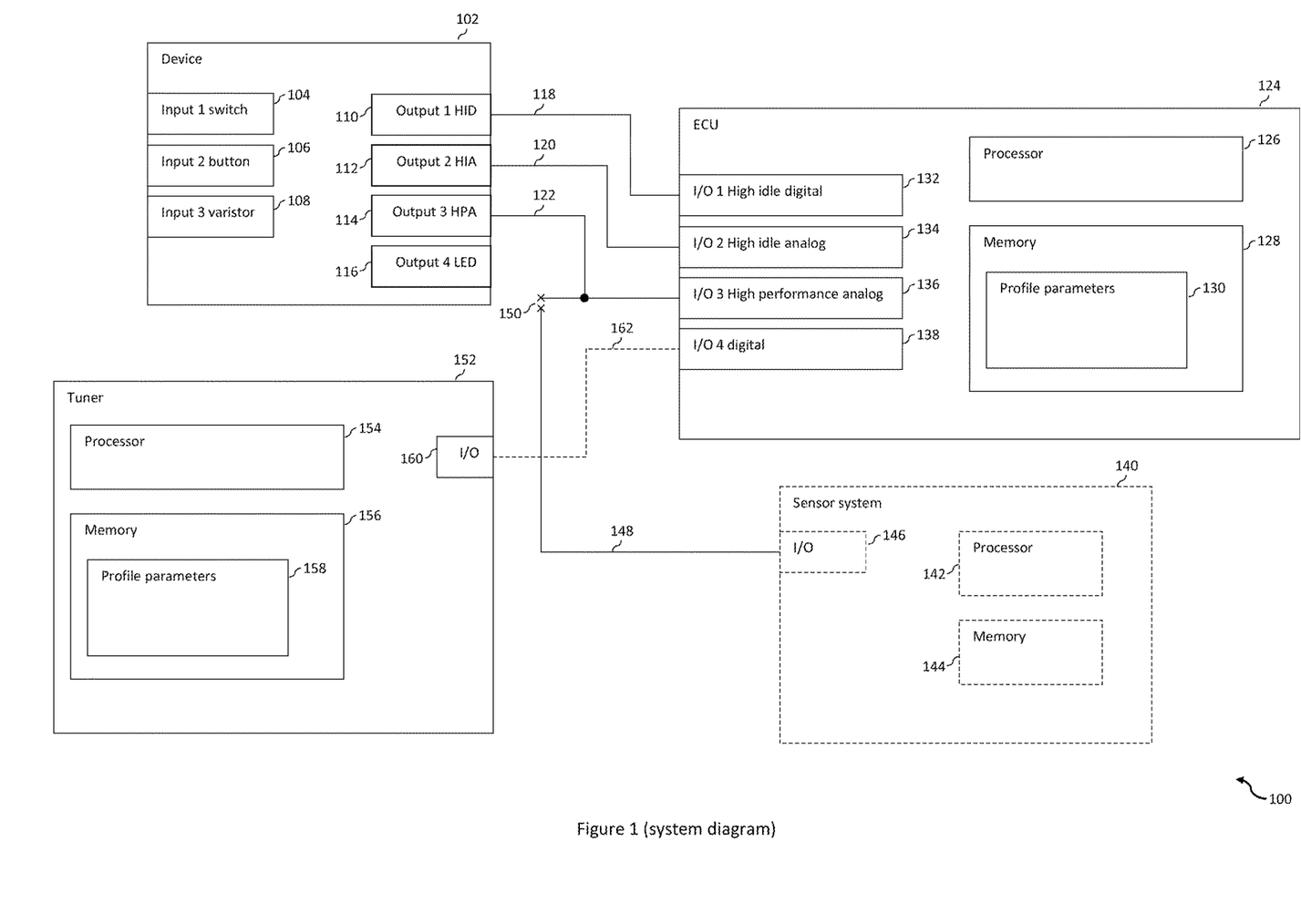
FIG. 1 is a block diagram of a system for changing the performance characteristics of a vehicle.

Referring to FIG. 1, system 100 is designed to change the performance characteristics of a vehicle during the operation of the vehicle. In order to do so, device 102 is installed in the vehicle and profile parameters 158 are loaded into memory 128 of engine control unit (ECU) 124. System 100 includes device 102, ECU 124, and tuner 152. System 100 optionally includes fuel temperature sensor system 140. The profile settings are used by ECU 124 to determine, calculate, and generate engine performance settings that are used to operate the engine of the vehicle. In a preferred embodiment, engine performance settings include valve open timings, valve close timings, throttle settings, boost pressure settings, and ignition timings.

Device 102 includes one or more inputs that can be manually operated and several outputs that can be analog or digital and can be electrical or optical. In a preferred embodiment, device 102 includes three inputs 104, 106 and 108 and four outputs 110, 112, 114 and 116.

Input switch 104 includes at least a single poll single throw switch, the operation of which controls high idle digital output 110 and high performance analog output 114. In a preferred embodiment, input switch 104 is a mechanical multi-position rotary switch having four (4) locking positions. Input 106 is a spring return momentary push button switch, the operation of which controls optical output 116. Input 108 is a varistor that provides an analog output signal that is utilized by high idle analog output 112.

High idle digital output 110 is a digital electrical output that indicates whether the high idle mode and is controlled by input switch 104.

High idle analog output 112 is an analog electrical output that identifies the high idle mode desired RPM parameter when the high idle mode is enabled. High idle analog output 112 is controlled by input 108.

High performance analog output 114 is an analog electrical output that system 100 uses to identify the level of performance when the high performance mode is active. The analog output of high performance analog output 114 is controlled by input switch 104.

Optical output 116 is a digital optical output. In a preferred embodiment, optical output 116 is a light emitting diode that indicates whether input 106 is activated. Activation of input 106 tests whether device 102 has been properly connected to the power system of the vehicle. When device 102 has not been properly connected to the power system with vehicle, optical output 116 is not illuminated.

High idle digital output 110, high idle analog output 112 and high performance analog output 114 are respectively connected to high idle digital input 132, high idle analog input 134 and high performance analog input 136 of ECU 124 through connections 118, 120 and 122. Connection 122 between high performance analog output 114 of device 102 and high performance analog input 136 of ECU 124 takes the place of connection 148 from fuel temperature sensor system 140 to ECU 124, as shown by disconnect 150.

The outputs from device 102 provide voltage signals that range from about 0 volts to about 12 volts based on the ignition power. The voltage signals from device 102 are buffered, clamped, and reduced down to about 0 volts or 5 volts internally by ECU 124 protect the internal low voltage circuitry and references within ECU 124.

ECU 124 controls one or more systems and devices related to the engine of a vehicle. In a preferred embodiment ECU 124 is used to control the performance of the engine by adjusting one or more parameters, settings, and timings related to the actuators that operate the engine. ECU 124 reads values from multiple sensors, devices, and systems within the vehicle, compares those values to multidimensional performance maps and look up tables, and adjusts the timings, settings, and parameters based on the values identified using the lookup tables and multidimensional performance maps.

ECU 124 includes at least one processor 126 and at least one memory 128. Memory 128 includes data, codes, and instructions that, when executed by processor 126, cause ECU 124 to operate the engine of the vehicle and interact with other systems, devices, modules, and components using one or more input output ports. Memory 128 also stores profile parameters 130 which contain the parameters, values, and instructions that form a calibration, which is stored in an ECU profile that is used by ECU 124 to operate the engine of the vehicle. Profile parameters 130 can be read from memory 128 and transmitted by ECU 124 to an external system or device and profile parameters 130 can be overwritten with different profile parameters, such as those from tuner 152.

In a preferred embodiment, profile parameters 130 are not the originally installed factory default parameters since the factory default parameters do not support device 102. Rather, the original parameters have been replaced by updated parameters that allow for the use and operation of device 102 to control the high idle and high performance functionality. In a preferred embodiment, the updated parameters include performance increasing adjustments based on a fuel temperature measurement signal that has been overridden by high performance analog output 114 of device 102 to control the high performance functionality. When the fuel temperature measurement signal supplied by device 102 is at a minimum or normal value (e.g., 0 volts) the profile parameters—including one or more values, lookup tables, and maps that reference maximum allowed torque vs measured fuel temp—are set so that ECU 124 will provide stock engine performance. Profile parameters 130 are set so that, as the fuel temperature measurement signal rises up to about 5 volts, ECU 124 will provide increasing performance for higher fuel temperature readings. In a preferred embodiment, there are discrete levels of performance that each have a range of voltages that are utilized by ECU 124 to control the performance of the vehicle, an example of which is shown in Table 1 below.

TABLE 1

| Threshold | Voltage range | Performance Level |
|---|---|---|
| First | below 1 volt | Stock performance |
| Second | 1 to 2 volts | fourth highest performance |
| Third | 2 to 3 volts | third highest performance |
| Fourth | 3 to 4 volts | second highest performance |
| Fifth | above 4 volts | Highest performance |

ECU 124 includes high idle digital input 132, high idle analog input 134, high performance analog input 136 and digital input 138. In a preferred embodiment, high idle digital input 132 and high idle analog input 134 are used to control a high idle and high performance functions and are connected to high idle digital output 110 and high idle analog output 112 with connections 118 and 120, respectively, of device 102. High idle digital input 132 is configured as a digital input port and high idle analog input 134 is configured as an analog port.

When high idle digital input 132 provides a high input, ECU 124 engages the high idle functionality. The amplitude of the analog signal received from high idle analog input 134 identifies the idle RPM value that ECU 124 will use when the high idle functionality is engaged. When the high idle functionality is engaged, ECU 124 will adjust other engine settings, such as the throttle position, to bring the measured RPM value of the engine to the desired RPM value that is encoded as the amplitude of the analog signal received with high idle analog input 134.

When high idle digital input 132 provides a low input, ECU 124 does not engage the high idle functionality and engages in the high performance functionality that is based on the signal received from high performance analog input 136. High performance analog input 136 is configured as an analog input port that receives an analog signal that is utilized by ECU 124 to control performance characteristics of the vehicle. High performance analog input 136 is connected to high performance analog output 114 of device 102 with connection 122. Additionally, connection 148 between high performance analog input 136 of ECU 124 and input output port 146 of fuel temperature sensor system 140 is disconnected as shown by disconnect 150. In a preferred embodiment, high performance analog input 136 is configured to receive fuel temperature measurement values that ECU 124 uses with one more look up tables to identify actuator timings that ECU 124 will use to operate the actuators of the engine of the vehicle.

Digital input 138 is configured as a digital input output port. Digital input 138 is used to transmit and receive profile parameters 130 to and from external devices, such as tuner 152, utilizing a CAN bus computer network.

Fuel temperature sensor system 140 is a sensor system that has been disconnected from ECU 124 to allow device 102 to control the high performance functionality. In a preferred embodiment, fuel temperature sensor system 140 is a fuel temperature measurement system that does not have a processor, memory, logic within it and is a passive thermistor that is installed inline on the fuel feed pipe to measure fuel temperature. The measurement values detected by fuel temperature sensor system 140 are provided via input output port 146 to ECU 124 when connection 148 between input output port 146 of fuel temperature sensor system 140 and high performance analog input 136 of ECU 124 is not disconnected, i.e., when disconnect 150 is not present. An additional embodiment of fuel temperature sensor system 140 optionally includes processor 142, memory 144, and input output port 146. Memory 144 stores data, code, and instructions that when executed by processor 142, generate measurement values related to the vehicle and are optimally stored in memory 144.

Tuner 152 is an external device that is removably connected to ECU 124 and is used to monitor, control, and reprogram ECU 124. Tuner 152 includes at least one processor 154, at least one memory 156, and at least one input output port 160. Memory 156 includes data, codes, and instructions that, when executed by processor 154, cause tuner 152 to perform several functions including: reprogramming ECU 124, reading data from ECU 124, and displaying data received from ECU 124. Memory 156 stores profile parameters 158 that are collectively referred to as an ECU profile. Memory 156 stores one or more ECU profiles that can be downloaded to ECU 124. When profile parameters 158 are downloaded to ECU 124 and are utilized by ECU 124, the operation of device 102 with ECU 124 is enabled so that high idle digital output 110, high idle analog output 112, high performance analog output 114 and optical output 116 of device 102 can control ECU 124 to operate with high performance and high idle functionality.

In a preferred embodiment, device 102 is installed inside a cabin area of the vehicle near the dashboard. Installation within the cabin area allows for the performance of the vehicle to be changed during operation of the vehicle by manipulating the inputs of device 102. To install device 102, wires are routed from high idle digital output 110, high idle analog output 112 and high performance analog output 114 of device 102 to ECU 124, which is inside an engine bay of the vehicle. In an optional embodiment, one or more of the ports of ECU 124 already have wires that are routed to the cabin area of the vehicle and device 102 is installed using these wires.

Figure 2:
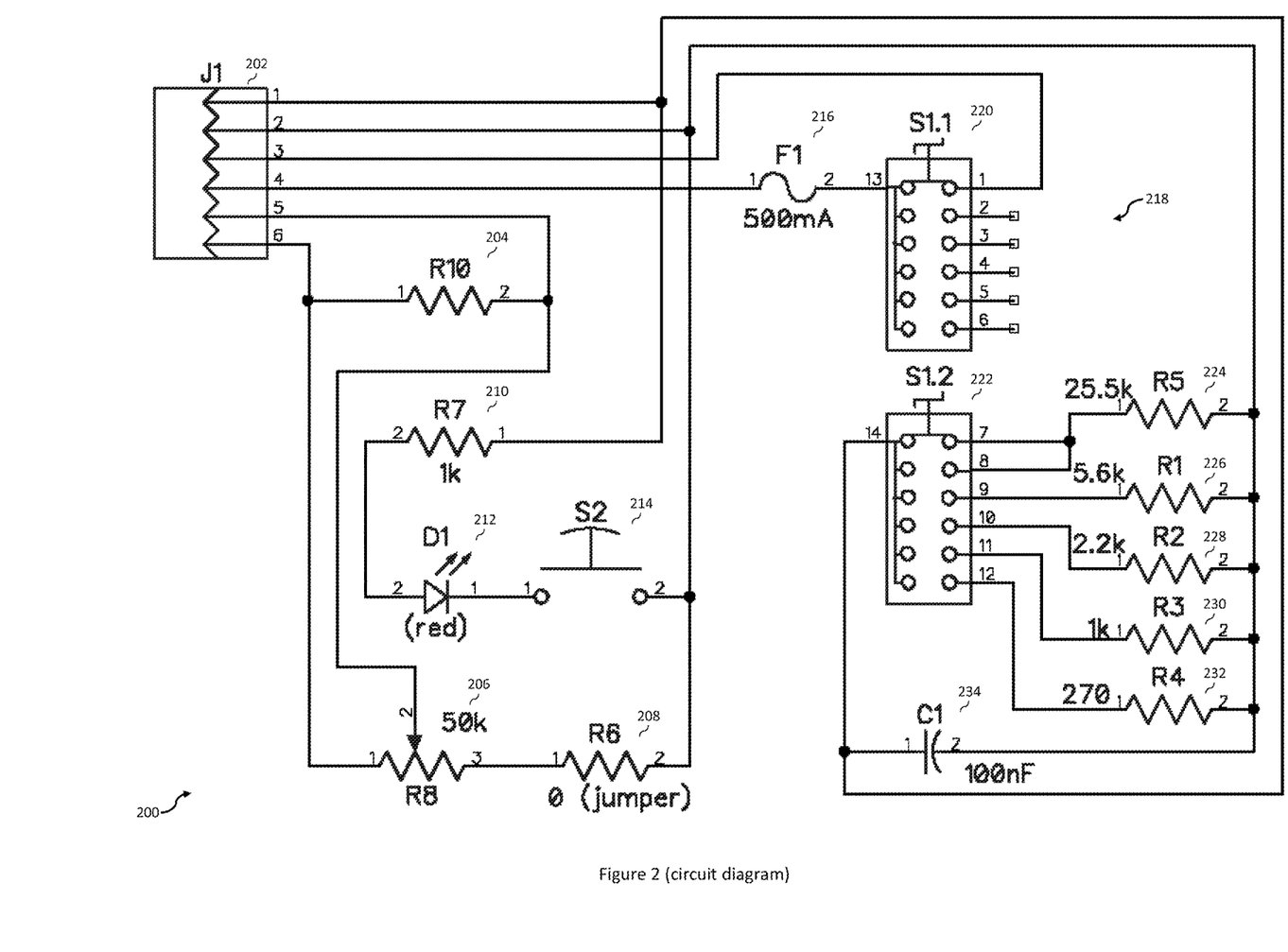
FIG. 2 is a circuit diagram of a device for changing the performance characteristics of a vehicle.

Referring to FIG. 2, circuit 200 is a preferred embodiment of a circuit within device 102 of FIG. 1 for controlling the high idle and high performance functionality of a vehicle. Circuit 200 includes several components that, in one embodiment are discrete components soldered to a printed circuit board. Each component includes two or more numbered contacts.

Header J1 202 includes six contacts. Contacts 1 and 2 of header J1 202 connect to the circuits that control high performance analog output 114 of device 102 and optical output 116 of device 102. Contacts 3 and 4 of header J1 202 connect to the circuits that control the high idle digital output 110 of device 102. Contacts 5 and 6 of header J1 202 are connected to circuit components that control the high idle analog output 112 of device 102. Header J1 202 forms the external connection of device 102. Each of the contacts of header J1 202 are connected to ports of ECU 124, as shown in FIG. 1, so that device 102 can control the high idle and high performance functionality.

The circuit that controls high idle analog output 112 includes resistor R10 204, varistor R8 206, and resistor R6 208. Varistor R8 206 is a mechanically controlled resistance that is set using a screwdriver, in one embodiment. Increasing or decreasing the resistance provided by varistor R8 206 by mechanically turning a control knob of varistor R8 206 controls the idle RPM value that the ECU 124 will attempt to match when the high idle functionality is engaged. In a preferred embodiment, the high idle analog output has a minimum value of about 0 volts and a maximum value of about 5 volts, which are mapped to a minimum value of about 900 RPM and a maximum value of about 3,000 RPM by ECU 124. Resistor R10 204 and resistor R6 208 are optional components. In a preferred embodiment, resistor R10 204 and resistor R6 208 can be used as optional jumpers that enable or disable the high idle analog output. Preferred values for these components are shown below in Table 2:

TABLE 2

| Component | Value |
|---|---|
| R10 | 0 ohms |
| R8 | 0-50 k ohms |
| R6 | 0 ohms |

The circuit that controls optical output 116 includes resistor R7 210, light emitting diode (LED) D1 212, and switch S2 214. Resistor R7 210 is a current limiting resistor that limits the amount of current that will flow through LED D1 212. LED D1 212 is illuminated when contacts one and two of switch S2 214 are closed by actuated switch S2 214 and device 102 is properly connected to the power supply of the vehicle in which ECU 124 is installed. The optical signal provided by LED D1 212 allows the user to ascertain whether or not device 102 has been properly installed in the vehicle. In a preferred embodiment, resistor R7 210 is about a 1 kilo ohm resistor and varistor R8 206 has a maximum resistance of about 50 kilo ohms The circuit that controls high idle digital output 110 and high performance analog output 114 contains several components, including fuse F1 216, switch S1 218, resistors 224, 226, 228, 230 and 232, and capacitor C1 234. Fuse F1 216 protects the device 102 from short circuit and protects the wire from the device 102 to ECU 124 from overheating should a short circuit occur. In a preferred embodiment fuse F1 216, is rated at about 500 milliamps (mA). Capacitor C1 234 is a decoupling capacitor that reduces noise generated by switch S1 218 and, in a preferred embodiment, has a capacitance of about 100 nano Farads (nF).

In a preferred embodiment, switch S1 218 is a six (6) position rotary switch including switch S1.1 220 and switch S1.2 222. Table 3 below shows the connections between the contacts of switch S1.1 220 and switch S1.2 222 for the six different positions that are available with switch S1 218.

TABLE 3

| S1 switch position | S1.1 Connection | S1.2 Connection | Resistor connected |
|---|---|---|---|
| First position | contacts 13 and 1 | contacts 14 and 7 | R5 224 |
| Second position | contacts 13 and 2 | contacts 14 and 8 | R5 224 |
| Third position | contacts 13 and 3 | contacts 14 and 9 | R1 226 |
| Fourth position | contacts 13 and 4 | contacts 14 and 10 | R2 228 |
| Fifth position | contacts 13 and 5 | contacts 14 and 11 | R3 230 |
| Sixth position | contacts 13 and 6 | contacts 14 and 12 | R4 232 |

Preferred values for these components are shown below in Table 4.

TABLE 4

| Component | Value |
|---|---|
| R1226 | 5.6 k ohms |
| R2228 | 2.2 k ohms |
| R3230 | 1.0 k ohms |
| R4232 | 270 k ohms |
| R5224 | 25.5 k ohms |

Each position of switch S1 218 is associated with one or more sets of performance parameters that are stored in an ECU profile that is loaded onto ECU 124, as shown in the Table 5.

TABLE 5

| S1 switch position | set of parameters in ECU profile | Performance level |
|---|---|---|
| First position | fifth set of parameters | high idle/factory performance |
| Second position | fifth set of parameters | factory performance |
| Third position | fourth set of parameters | fourth highest performance |

TABLE 5-continued

| S1 switch position | set of parameters in ECU profile | Performance level |
|---|---|---|
| Fourth position | third set of parameters | third highest performance |
| Fifth position | second set of parameters | second highest performance |
| Sixth position | first set of parameters | highest performance |

The first and second positions are associated with the same set of performance parameters and each of the third through sixth positions are associated with a different sets of performance parameters. In a preferred embodiment, the first and second positions are associated with stock factory performance parameters and each of the third through sixth positions are associated with sets of parameters that yield higher performance than the stock factory performance parameters.

When switch S1 218 is in the first position, high idle digital output 110 of device 102 provides a high voltage signal output that causes ECU 124 to enable the high idle functionality by connecting contact 13 to contact 1 of switch S1 218 to close the circuit between contacts 3 and 4 of header J1 202. When switch S1 218 is in the second through sixth positions, high idle digital output 110 of device 102 provides a low voltage signal output that causes ECU 124 to disable the high idle functionality by connecting contact 13 to one of contacts 2 through 6 creating an open circuit.

High performance analog output 114 is controlled by switch S1.2 222 with a set of resistors that includes resistors R5 224, R1 226, R2 228, R3 230 and R4 232. When switch S1 218 is in the first or second position, switch S1.2 222 connects contact 14 to either contact 7 or contact 8, either of which connects resistor R5 224 in series between contacts 1 and 2 of header J1 202 forming a closed circuit when device 102 is properly installed. Resistor R5 224 causes device 102 to send a voltage signal on high performance analog output 114 that corresponds with the lowest or factory level of performance. In this way, when the high idle functionality is engaged or when the lowest level of high performance functionality is engaged, ECU 124 will provide the same factory default performance. When switch S1 218 is in one of the third through sixth positions, one of resistors R5 224, R1 226, R2 228, R3 230 and R4 232 are respectively connected to contacts one and two of header J1 202 to form a complete circuit when properly installed. In the third position, resistor R1 226 causes device 102 to generate a signal that causes ECU 124 to operate the engine of the vehicle at a performance that is higher than when switch S1 218 is in either the first or second position. Each successive position of switch S1 218 connects a lower resistance in series that causes device 102 to provide a different voltage signal that causes ECU 124 to increase performance based upon the different voltage signal. In a preferred embodiment, as the resistance decreases, the performance of the engine as controlled by ECU 124 increases by using different parameters and lookup table values based on the different voltage signals.

Figure 3:
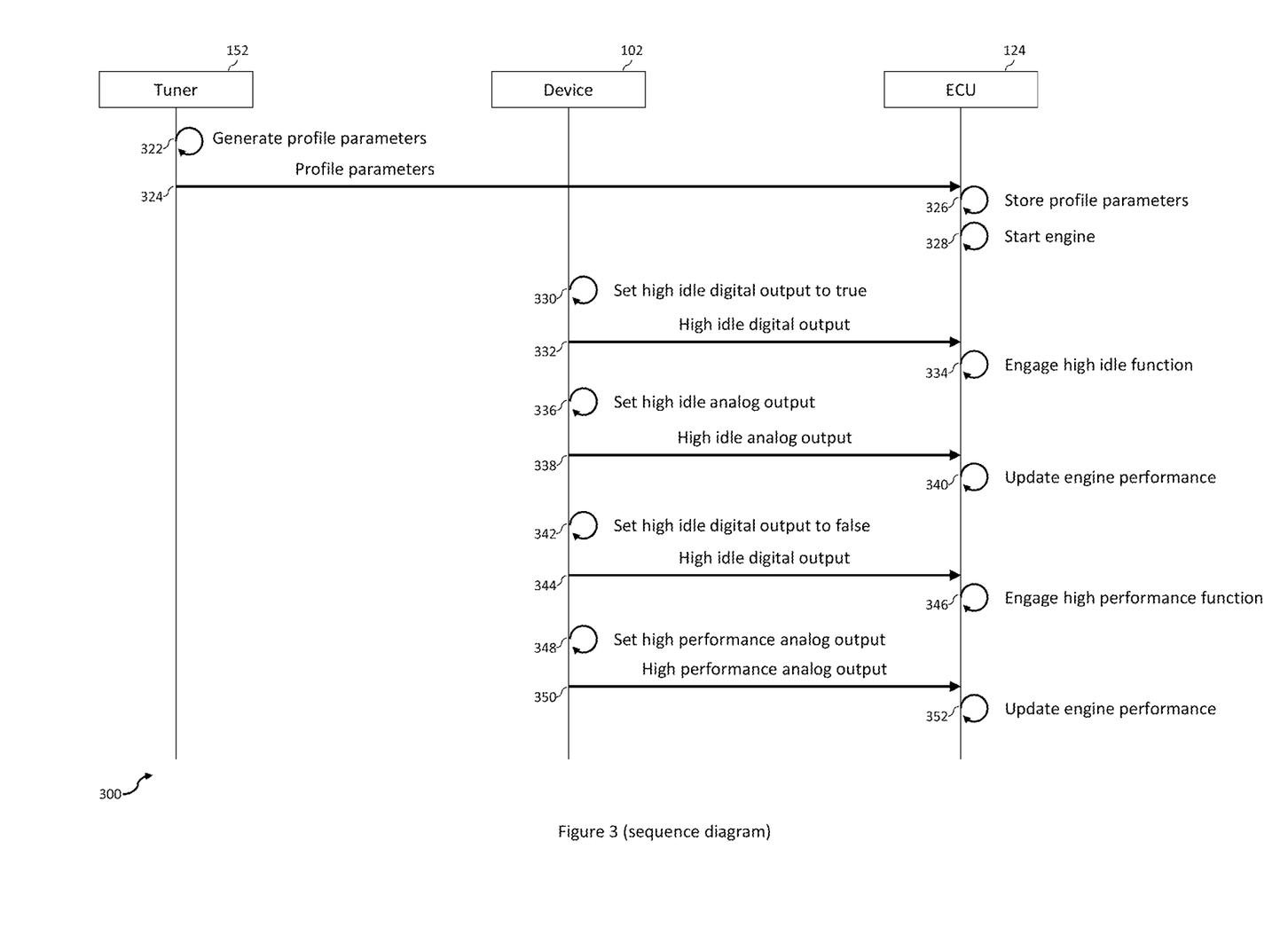
FIG. 3 is a sequence diagram of a system that changes the performance characteristics of a vehicle.

Referring to FIG. 3, sequence 300 is performed with tuner 152, device 102, and ECU 124 to control the high idle and high performance functionality provided by ECU 124 by utilizing device 102 and profile parameters 158 provided by tuner 152.

At step 322, tuner 152 generates profile parameters. In a preferred embodiment, the profile parameters are downloaded from the internet to tuner 152. Tuner 152 may then be used to display and further adjust the performance parameters. The profile parameters include one or more sets of performance parameters that are each associated with a level of performance.

At step 324, tuner 152 sends the profile parameters to ECU 124. Profile parameters are sent through connection 162 between input output port 160 of tuner 152 and digital input 138 of ECU 124 using the onboard diagnostic (OBD II) protocol.

At step 326, the profile parameters are stored by ECU 124. In a preferred embodiment, the old profile parameters are discarded by ECU 124. In an additional embodiment, ECU 124 includes additional storage space in which to store multiple ECU profiles that each have their own profile parameters and sets of performance parameters.

At step 328, the engine is started by ECU 124. The engine is started in response to user activation of the ignition system of the vehicle.

At step 330, high idle digital output is set to true by device 102. In a preferred embodiment, a user of device 102 mechanically operates a switch S1 218 to be in the first position to engage the high idle functionality.

At step 332, device 102 sends the high idle digital output, which is received by ECU 124.

At step 334, the high idle function is engaged by ECU 124. ECU 124 continuously monitors the high idle digital output and engages the high idle functionality in response to changes of the high idle digital output. In a preferred embodiment, the digital voltage signal that is used as the high idle digital output is either set to about 5 volts for a "true" value or to about 0 Volts for a "false" value. Transitioning to the 5-volt true value triggers the engagement of the high idle functionality and transitioning to the 0 volt false value triggers the disengagement of the high idle functionality. In order to engage the high idle mode, several vehicle status checks must be performed to ensure that the vehicle is not in gear and is not moving. Status of the transmission and the speed of the vehicle are checked by ECU 124 prior to engaging the high idle functionality. Parking brake status is checked to make sure parking brake is applied and service-brake status is checked to make sure that the service brake is released.

At step 336, device 102 sets high idle analog output. The high idle analog output is an analog voltage signal that can be anywhere in the range from about 0 to about 5 volts. The value of the voltage signal is set by turning a screw on varistor R8 206, which adjusts the amount of resistance provided by varistor R8 206.

At step 338, device 102 sends the high idle analog output, which is received by ECU 124.

At step 340, engine performance is updated by ECU 124. After engaging the high idle mode, ECU 124 for continuously checks for the value of the high idle analog voltage signal provided by device 102. The voltage values of the high idle analog voltage signal correspond to desired RPM values for the engine while the engine is in the high idle mode and performing the high idle functionality. ECU 124 maps the high idle analog voltage signal to a desired RPM value, compares the value of the desired RPM value to the current measured RPM value of the engine, and adjusts the throttle control of the vehicle to bring the measured RPM value of the vehicle closer to the desired RPM value identified by the high idle analog voltage signal.

At step 342, high idle digital output is set to false by device 102. Setting the high idle digital output to false will cause ECU 124 to disengage the high idle functionality and to engage the high performance functionality. To set the high idle digital output to false, switch S1 218 is manipulated from being in the first position to being in one of the second through sixth positions.

At step 344, the high idle digital output is transmitted from device 102 and subsequently received by ECU 124.

At step 346, ECU 124 engages the high performance function. After detecting the transition of the high idle digital output from being true to being false, ECU 124 disengages the high idle functionality and engages the high performance functionality.

At step 348, high performance analog output is set by device 102. The high performance analog output is a voltage signal in the range of about 0 to about 5 volts. In a preferred embodiment, device 102 provides five discrete levels for the high performance analog output voltage signal.

At step 350, high performance analog output is sent from device 102 to ECU 124.

At step 352, ECU 124 updates engine performance. The value of the high performance analog output voltage signal is included as one of a set of measured values that ECU 124 uses to determine the engine settings to use for the engine to run. The engine settings are determined by using the set of measurements as inputs to one or more lookup tables, the outputs of which include the engine settings used by ECU 124.

Figure 4:
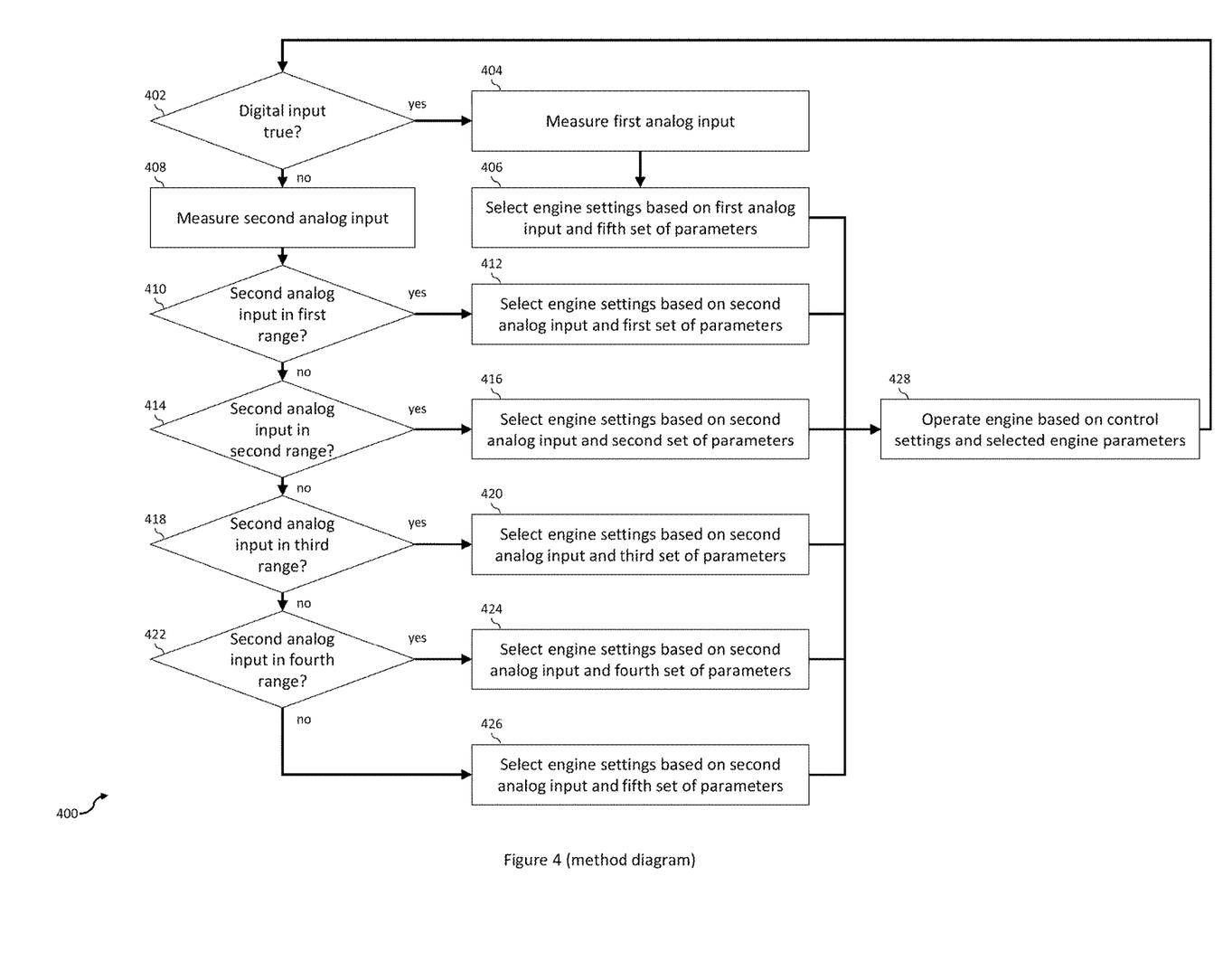
FIG. 4 is a diagram of a method for changing the performance characteristics of a vehicle.

Referring to FIG. 4, method 400 controls the engine settings used to operate the engine of a vehicle by ECU 124 and thereby controls the performance of the engine and the vehicle. Method 400 runs continuously on ECU 124 after the engine has been started and after an ECU profile with parameters, settings, code, and instructions that allow for the use of device 102 to control the performance of the engine has been loaded onto memory 128 of ECU 124. The ECU profile used by ECU 124 includes five sets of parameters. Each set of parameters includes one or more adjustments to the look up tables, values, parameters, and settings that are used to determine the engine settings for operating the engine. The fifth set of parameters is used for stock factory performance, the first set of parameters is used for the highest engine performance, and the second through fourth sets of parameters provide performance levels between the first (highest performance) and fifth (stock performance) sets of parameters.

At step 402, ECU 124 determines whether high idle digital input 132 is true or false. High idle digital input 132 is received as a voltage signal that is either about 0 volts for false or about 5 volts for true (the 5 volt level is internal to ECU 124 after being buffered, clamped, and reduced from the original 12 volt signal provided by device 102). When high idle digital input 132 is true, step 402 proceeds to step 404, or otherwise precedes to step 408.

At step 404, ECU 124 has identified that high idle digital input 132 is true and engages the high idle mode to perform the high idle functionality. As a part of engaging the high idle functionality, ECU 124 measures high idle analog input 134. High idle analog input 134 is an analog voltage signal that ranges from about 0 volts to about 5 volts. The voltage range for high idle analog input 134 is mapped to a range of desired RPM values so that a voltage of about 0 volts is mapped to about 900 RPM and a voltage of about 5 volts is mapped to about 3,000 RPM and linear interpolation is used for values between these two points.

At step 406, ECU 124 selects engine control settings based on high idle digital input 132 and the fifth set of parameters. In a preferred embodiment, the analog voltage signal is passed through an analog to digital converter that converts the analog voltage to a first binary value. The first binary value, in a preferred embodiment, is an 8-bit unsigned integer where a value of 0 corresponds to a desired RPM value of about 900 RPM and a value of 255 corresponds to a desired RPM value of about 3,000 RPM, as seen in Table 6 below.

TABLE 6

|  | Analog input voltage | 8-bit AD Conversion | Desired RPM |
| --- | --- | --- | --- |
| Minimum value | 0 | 0 | 900 |
| Maximum value | 5 | 255 | 3,000 |

Additional embodiments have different values for the minimum and maximum desired RPM values.

The first binary value is compared to a second binary value that corresponds to the current engine RPM value. The engine RPM value is a 16-bit unsigned integer that scales from about 0 to about 16383.75 so that when the second binary value is divided by 4, that quotient is the current RPM of the engine, which is shown in Table 7 below.

TABLE 7

|  | 16-bit RPM value | Engine RPM |
| --- | --- | --- |
| Minimum value | 0 | 0 |
| Maximum value | 65535 | 16383.75 |

To compare the desired RPM with the current engine RPM, a third binary value is formed from the second binary value using the equation below.

$$B = A * 35/17 + 225 \qquad \text{Eq. 1}$$

A is the 8-Bit unsigned integer that represents the desired RPM from a minimum of about 900 to a maximum of about 3,000 and B is a 16-bit unsigned integer value that has the same scale as the 16-bit unsigned integer value for the engine RPM. In a preferred embodiment, the conversion from the first binary value to the third binary value is performed using a lookup table instead of using discrete calculations.

After rescaling and normalizing the desired RPM value, ECU 124 compares the desired RPM value to the current engine RPM value. In a preferred embodiment, this comparison is performed by subtracting the engine RPM value from the desired RPM value to create an RPM difference value. When the RPM difference value is positive, ECU 124 increases the value for the throttle control of the vehicle; when the RPM difference value is negative, ECU 124 decreases the value for the throttle control of the vehicle; and, when the RPM difference value is 0, ECU 124 does not change the value for the throttle control of the vehicle. In a preferred embodiment, the increase or decrease to the value of the throttle control of the vehicle is based on the magnitude of the RPM difference value.

At step 408, ECU 124 receives and measures high performance analog input 136. In a preferred embodiment, high performance analog input 136 is a voltage signal that ranges from about 0 volts to about 5 volts. The voltage signal is converted to an 8-bit unsigned integer using an analog to digital converter. The minimum value output from the analog to digital converter of 0 correlates to a temperature of −40 degrees Celsius and the maximum output value from the analog to digital converter of 255 correlates to 215 degrees Celsius, which is shown in Table 8 below.

TABLE 8

|  | Analog input voltage | 8-bit AD Conversion | Fuel temperature |
| --- | --- | --- | --- |
| Minimum value | 0 | 0 | −40 |
| Maximum value | 5 | 255 | 215 |

The following equation converts the numerical output from the analog to digital converter to the actual temperature that is identified by high performance analog input 136.

$$\text{FUEL\_TEMPERATURE} = \text{INPUT} - 40 \qquad \text{Eq. 2}$$

Instead of being provided by fuel temperature sensor system 140, high performance analog input 136 is provided by device 102 and may not correlate with the actual fuel temperature that is measured by fuel temperature sensor system 140.

At step 410, when the digital value for high performance analog input 136 is within a first predefined range, step 410 proceeds to step 412. At step 412, ECU 124 selects engine settings based on the digital value of high performance analog input 136 and the first set of parameters. In a preferred embodiment, steps 410 and 412 are performed by using a lookup table that uses the digitally converted value of the high performance analog input 136 as the address of an array and then uses the value located at that address as the selected engine setting.

In a preferred embodiment, several lookup tables are adjusted to provide the performance improvement for the first set of parameters. The process of selecting the engine settings used to operate the engine includes determining the current value of the throttle control, the current RPM level of the engine, and identifying a desired level of torque. One or more of these values are used as inputs to one or more lookup tables and the outputs from those look up tables are used to identify the value for the throttle control to achieve the desired level of torque. In a preferred embodiment, the first set of parameters, as well as the second through fourth sets of parameters, alter the ratios of desired torque level to required fuel amount. For example, the fifth set of parameters corresponds with stock factory set of parameters and has the value of 700 foot pounds of torque relating to 110 cubic millimeters of fuel per minute, whereas the first set of parameters for high performance relates a desired torque level of 700 foot pounds to a value of 150 cubic millimeters per minute of fuel so that more fuel will be provided when using the first set of parameters than when using the fifth set of parameters to achieve higher performance (torque) with the engine. In this way, the first through fourth sets of parameters reset the curves that are used in the lookup tables and multidimensional maps used to convert from a desired level of torque to a required amount of fuel.

At step 414, if the digital value for analog input 136 is within a second predefined range, then step 414 proceeds to step 416. At step 416, ECU 124 select engine settings based on the digital value of high performance analog input 136 and the second set of parameters in a manner that is similar to that described in step 412. The second set of parameters used in step 416 provides a lower level of engine performance as compared to the first set of parameters from step 412, but provides a higher level of performance compared to the third set of parameters from step 420.

At step 418, when the digital value for high performance analog input 136 is in a third range, step 418 precedes to step 420 to select engine settings based upon the digital value for high performance analog input 136 and the third set of parameters. The third set of parameters provides less performance than the second set of parameters and provides more performance than the fourth set of parameters.

At step 422, if the digital value for high performance analog input 136 is within a fourth range, then step 422 proceeds to step 424 and selects engine settings based on the digital value for high performance analog input 136 and the fourth set of parameters, which provides less performance than the third set of parameters and more performance than the fifth set of parameters.

Otherwise, when the digital value for high performance analog input 136 is not within the fourth range (or the first through third ranges), step 422 precedes to default step 426. At step 426, the digital value and the engine settings are selected based upon the digital value for high performance analog input 136 and the fifth set of parameters which corresponds to the stock set of parameters for the vehicle.

At step 428, after selecting the engine settings at any one of steps 406, 412, 416, 420, 424, and 426, method 400 uses the selected settings to operate the engine. The selection of the settings is based upon one more look up tables as well as inputs provided by device 102 and by devices, sensors, and systems of the vehicle, as described above. At step 428 the engine is operated based on the new parameters. The method then returns to step 402.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. An apparatus for controlling an engine control unit, the apparatus comprising:
a first manually operated switch;
a first set of positions, of the first manually operated switch, which change a set of outputs;
wherein the set of outputs controls a set of functionalities of the engine control unit; and,
wherein the set of outputs includes at least one digital output and at least one analog output.

2. The apparatus of claim 1, further comprising:
a second manually operated switch;
a second set of positions of the second manually operated switch which change an output of the set of outputs; and,
wherein the output is a variable resistance.

3. The apparatus of claim 2, wherein the variable resistance controls an idle setting of the engine control unit.

4. The apparatus of claim 2, wherein the first manually operated switch includes at least two fixed positions.

5. The apparatus of claim 4, wherein:
a first position, of the at least two fixed positions, engages a first output, of the set of outputs; and,
a second position, of the at least two fixed positions, engages a second output, of the set of outputs.

6. The apparatus of claim 5, wherein:
the first output, of the set of outputs, is a high idle digital output; and,
the second output, of the set of outputs, is a high performance analog output.

7. The apparatus of claim 1, further comprising:
a second manually operated switch; and,
a second set of positions, of the second manually operated switch, which indicate a set of test condition indicators.

8. The apparatus of claim 7, wherein the set of test condition indicators is optical.

9. The apparatus of claim 7, wherein the set of test condition indicators includes a correct connection indicator and an incorrect connection indicator.

10. The apparatus of claim 1, wherein the set of outputs is a set of discrete resistance values.

11. A method for controlling an engine control unit, the method comprising:
providing a first manually operated switch;
providing a first set of positions, of the first manually operated switch, which change a set of outputs;
wherein the set of outputs controls a set of functionalities of the engine control unit; and,
providing at least one digital output and at least one analog output as the set of outputs.

12. The method of claim 11, further comprising:
providing a second manually operated switch;
providing a second set of positions of the second manually operated switch which change an output of the set of outputs; and,
wherein the output is a variable resistance.

13. The method of claim 12, further comprising:
controlling an idle setting of the engine control unit with the variable resistance.

14. The method of claim 12, further comprising:
providing the first manually operated switch with at least two fixed positions.

15. The method of claim 14, further comprising:
providing a first position, of the at least two fixed positions, engaging a first output, of the set of outputs; and,
providing a second position, of the at least two fixed positions, engaging a second output, of the set of outputs.

16. The method of claim 15, further comprising:
providing the first output, of the set of outputs, as a high idle digital output; and,
providing the second output, of the set of outputs, as a high performance analog output.

17. The method of claim 11, further comprising:
providing a second manually operated switch; and,
providing a second set of positions, of the second manually operated switch, which indicate a set of test condition indicators.

18. The method of claim 17, further comprising:
providing the set of test condition indicators as optical.

19. The method of claim 17, further comprising:
providing the set of test condition indicators as a correct connection indicator and an incorrect connection indicator.

20. The method of claim 11, further comprising:
providing the set of outputs as a set of discrete resistance values.

* * * * *